(12) United States Patent
Yin et al.

(10) Patent No.: US 9,434,815 B2
(45) Date of Patent: Sep. 6, 2016

(54) METHOD FOR MAKING CARBON NANOTUBE COMPOSITE STRUCTURE

(71) Applicants: Tsinghua University, Beijing (CN); HON HAI PRECISION INDUSTRY CO., LTD., New Taipei (TW)

(72) Inventors: Yan-Li Yin, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/261,562

(22) Filed: Apr. 25, 2014

(65) Prior Publication Data

US 2015/0203632 A1 Jul. 23, 2015

(30) Foreign Application Priority Data

Jan. 22, 2014 (CN) .......................... 2014 1 0027788

(51) Int. Cl.
*C23C 16/00* (2006.01)
*C08G 73/02* (2006.01)
*C01B 31/02* (2006.01)

(52) U.S. Cl.
CPC ....... *C08G 73/0266* (2013.01); *C01B 31/0253* (2013.01)

(58) Field of Classification Search
CPC ...................................................... B82Y 30/00
USPC ............................................ 427/248.1, 255.6
See application file for complete search history.

(56) References Cited

U.S. PATENT DOCUMENTS

| | | | |
|---|---|---|---|
| 2007/0104860 A1* | 5/2007 | Gleason et al. ............. | 427/2.14 |
| 2010/0122980 A1* | 5/2010 | Wang ..................... | H05B 3/145 219/553 |
| 2011/0318486 A1* | 12/2011 | Liu et al. ....................... | 427/228 |
| 2014/0160630 A1* | 6/2014 | Kim et al. ..................... | 361/502 |

OTHER PUBLICATIONS

Pacheco-Catalan et al. Characterization of Composite Mesoporous Carbon/Conducting Polymer Electrodes Prepared by Chemical Oxidation of Gas-Phase Absorbed Monomer for Electrochemical Capacitors, Int. J. Electrochem. Sci., 6 (2011) pp. 78-90.*
Sharma, K.R, Polymer Thermodynamics: Blends, Copolymers and Reversible Polymerization, CRC Press, 2012, Chapter 2—PT phase diagram, p26.*

* cited by examiner

*Primary Examiner* — Kelly M Gambetta
(74) *Attorney, Agent, or Firm* — Zhigang Ma (57) ABSTRACT

A method for making a carbon nanotube composite structure includes suspending a carbon nanotube layer in a reactor. A polymer monomer solution and an oxidant solution are gasified by a pressure to form polymer monomer solution gas and oxidant solution gas. The polymer monomer solution gas is polymerized and chemically bonded to the carbon nanotube layer in initiation of the oxidant solution gas.

19 Claims, 10 Drawing Sheets

METHOD FOR MAKING CARBON NANOTUBE COMPOSITE STRUCTURE

RELATED APPLICATIONS

This application claims all benefits accruing under 35 U.S.C. §119 from China Patent Application No. 201410027788.5, filed on Jan. 22, 2014, in the China Intellectual Property Office, the disclosure of which is incorporated herein by reference.

BACKGROUND

1. Technical Field

The present application relates to a method for making carbon nanotube composite structure.

2. Discussion of Related Art

Carbon nanotubes can be composed of a plurality of coaxial cylinders of graphite sheets. Carbon nanotubes have interesting and potentially useful electrical and mechanical properties. Therefore, carbon nanotubes have become a significant focus of research and development for use in electron emitting devices, sensors, transistors, and other devices.

It is becoming increasingly popular for carbon nanotubes to be used to make composite materials. Carbon nanotubes composited with metals, semiconductors, or polymers result in a composite material with qualities of both materials. Generally, Carbon nanotubes composited with polymers can be made by dipping a carbon nanotube film into a polymer solution, wherein the carbon nanotube film includes a plurality of carbon nanotubes. However, the carbon nanotube film may be destroyed in such process because the carbon nanotube film is very thin.

What is needed, therefore, is to provide a method for making carbon nanotube composite structure that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
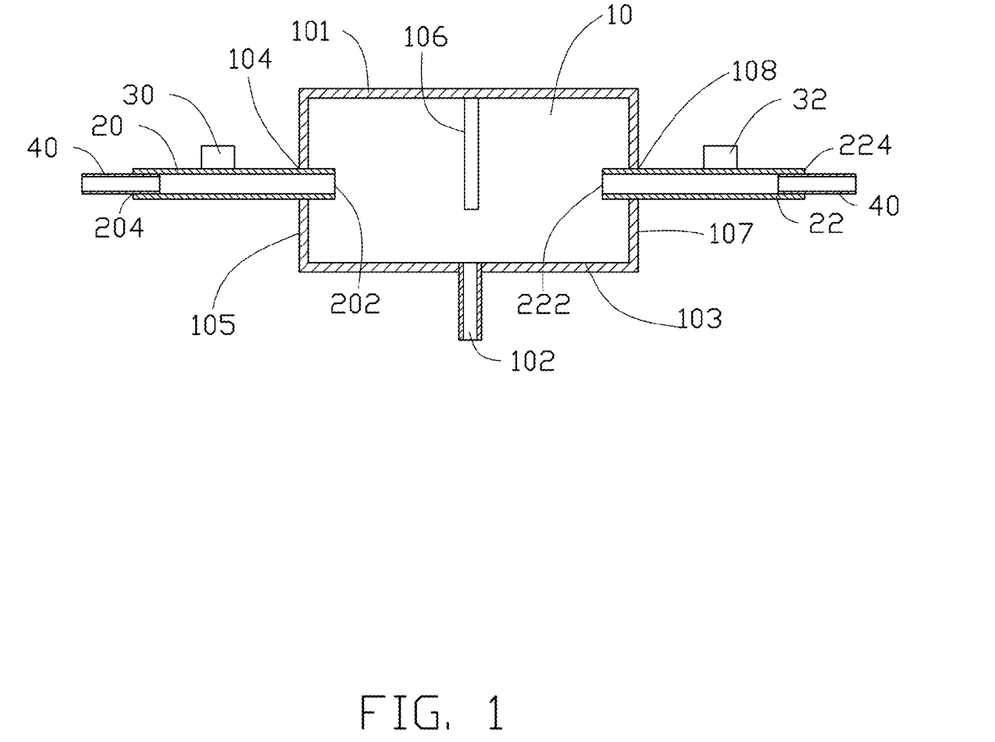
FIG. 1 is a schematic view of an apparatus according to one embodiment for making a carbon nanotube composite structure.

Referring to FIG. 1, a method for making carbon nanotube composite structure of one embodiment includes steps of:

(S11), suspending a carbon nanotube layer 106 in a reactor 10;

(S12), providing a polymer monomer solution and an oxidant solution; and (S13), gasifying the polymer monomer solution and the oxidant solution to form polymer monomer solution gas and oxidant solution gas by a pressure, wherein the polymer monomer solution gas is polymerized and chemically bonded to the carbon nanotube layer 106 in initiation of the oxidant solution gas.

In the step (S11), the carbon nanotube layer 106 includes a plurality of carbon nanotubes uniformly distributed therein. The plurality of carbon nanotubes can be combined by van der Waals attractive force. The carbon nanotube layer 106 can be a substantially pure structure of the carbon nanotubes, with few impurities. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm.

The plurality of carbon nanotubes in the carbon nanotube layer 106 can be orderly or disorderly arranged. The term 'disordered carbon nanotube' refers to the carbon nanotube layer 106 where the carbon nanotubes are arranged along many different directions, and the aligning directions of the carbon nanotubes are random. The number of the carbon nanotubes arranged along each different direction can be almost the same (e.g. uniformly disordered). The carbon nanotubes can be entangled with each other.

The term 'ordered carbon nanotube' refers to the carbon nanotube layer 106 where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

The carbon nanotube layer 106 includes at least one drawn carbon nanotube film, at least one flocculated carbon nanotube film, or at least one pressed carbon nanotube film.

Figure 2:
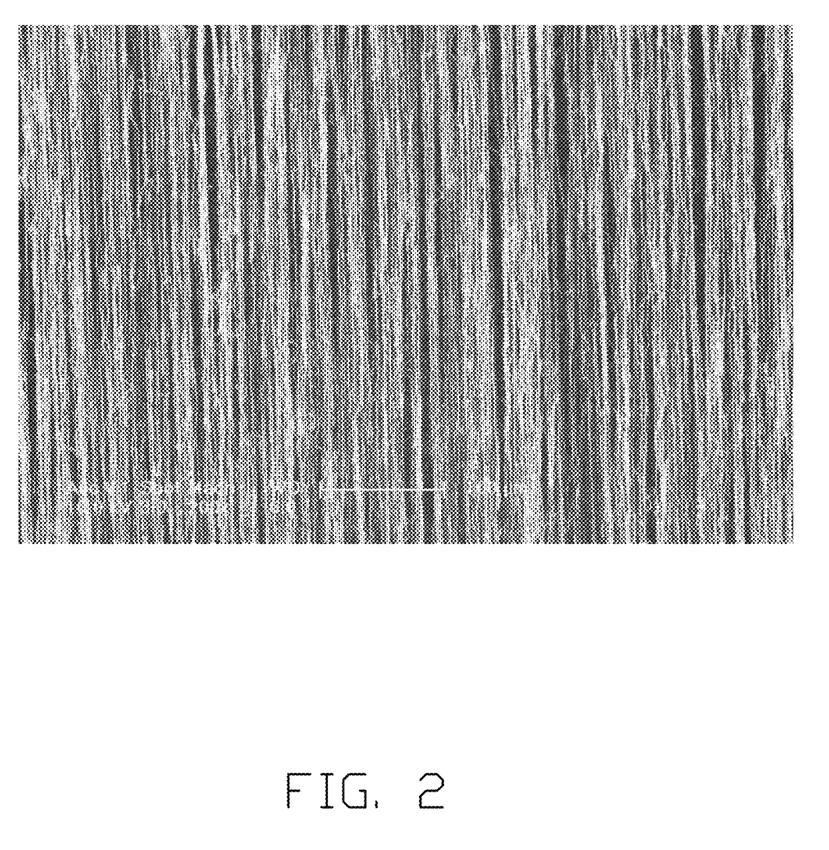
FIG. 2 shows a scanning electron microscope (SEM) image of a drawn carbon nanotube film.

Referring to FIG. 2, the at least one drawn carbon nanotube film includes a plurality of successive and oriented carbon nanotubes joined end-to-end by van der Waals attractive force therebetween. The carbon nanotubes in the drawn carbon nanotube film are oriented along a preferred orientation. The carbon nanotubes are parallel to a surface of the drawn carbon nanotube film. The at least one drawn carbon nanotube film is a free-standing film. The drawn carbon nanotube at least one film can bend to desired shapes without breaking. A film can be drawn from a carbon nanotube array to form the at least one drawn carbon nanotube film.

If the carbon nanotube layer 106 includes at least two stacked drawn carbon nanotube films, adjacent drawn carbon nanotube films can be combined by only the van der Waals attractive force therebetween. Additionally, when the carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can be in a range from about 0 degrees to about 90 degrees. Stacking the drawn carbon nanotube films will improve a mechanical strength of the carbon nanotube layer 106, further improving a mechanical strength of the carbon nanotube composite structure. In one embodiment, the carbon nanotube layer 106 includes two drawn carbon nanotube films, and the angle between the aligned directions of the carbon nanotubes in the two drawn carbon nanotube films is about 90 degrees.

Figure 3:
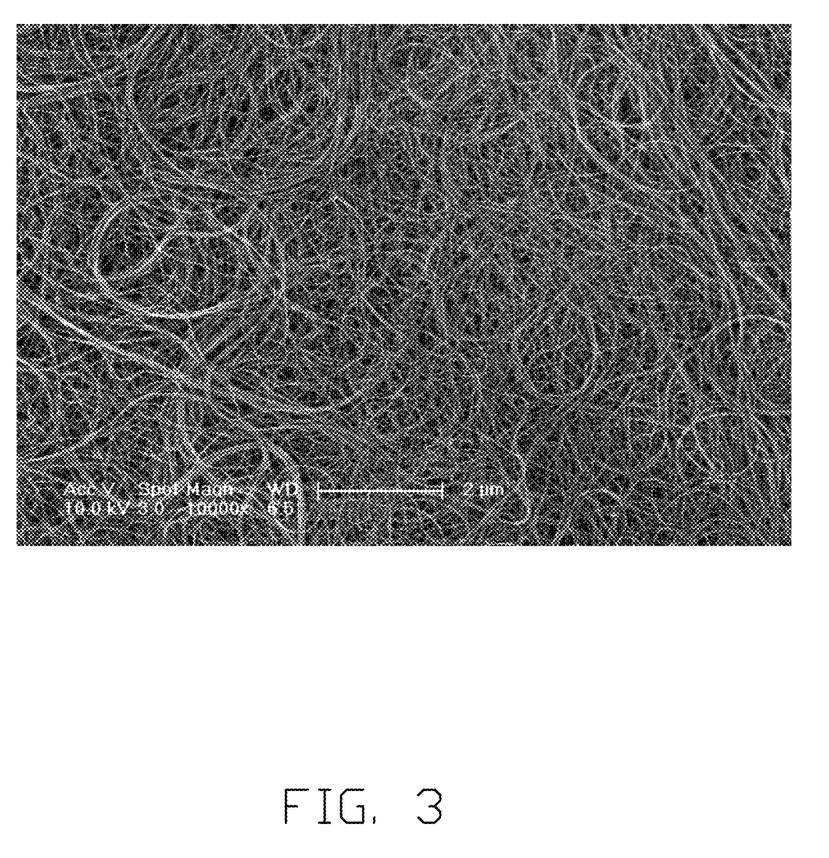
FIG. 3 is an SEM image of a flocculated carbon nanotube film.

Referring to FIG. 3, the at least one flocculated carbon nanotube film includes a plurality of long, curved, disordered carbon nanotubes entangled with each other. The at least one flocculated carbon nanotube film can be isotropic. The carbon nanotubes can be substantially uniformly dispersed in the at least one flocculated carbon nanotube film. Adjacent carbon nanotubes are acted upon by van der Waals attractive force to obtain an entangled structure. Due to the carbon nanotubes in the at least one flocculated carbon nanotube film being entangled with each other, the at least one flocculated carbon nanotube film has excellent durability, and can be fashioned into desired shapes with a low risk to the integrity of the at least one flocculated carbon nanotube film. Further, the at least one flocculated carbon nanotube film is a free-standing film.

Figure 4:
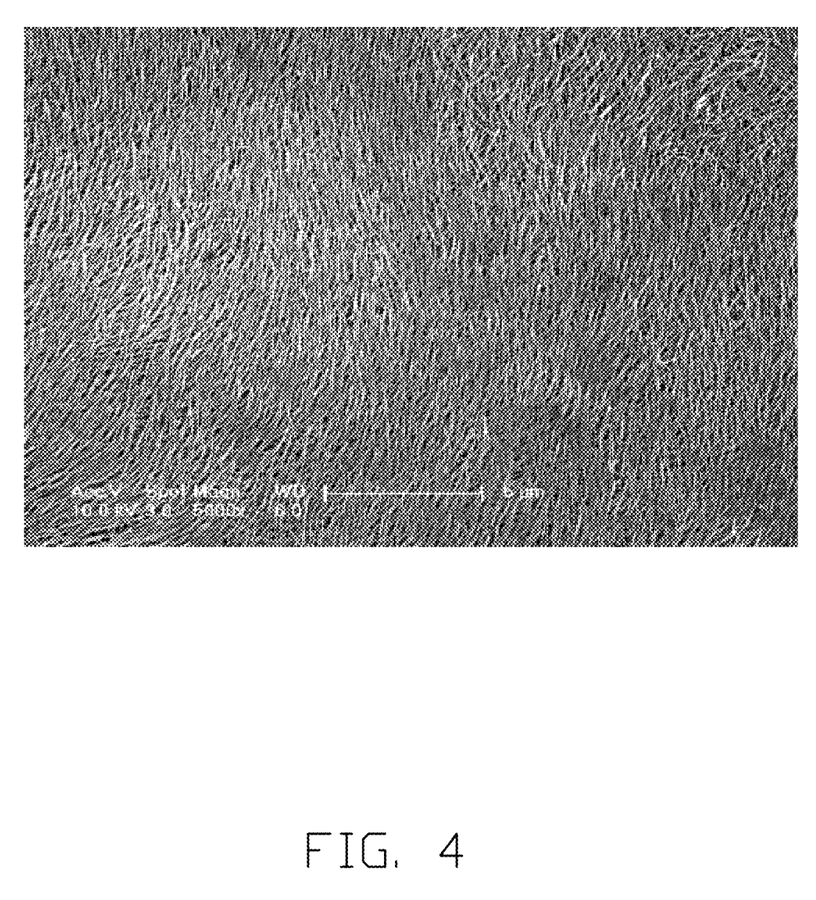
FIG. 4 is an SEM image of a pressed carbon nanotube film including a plurality of carbon nanotubes arranged along a same direction.
Figure 5:
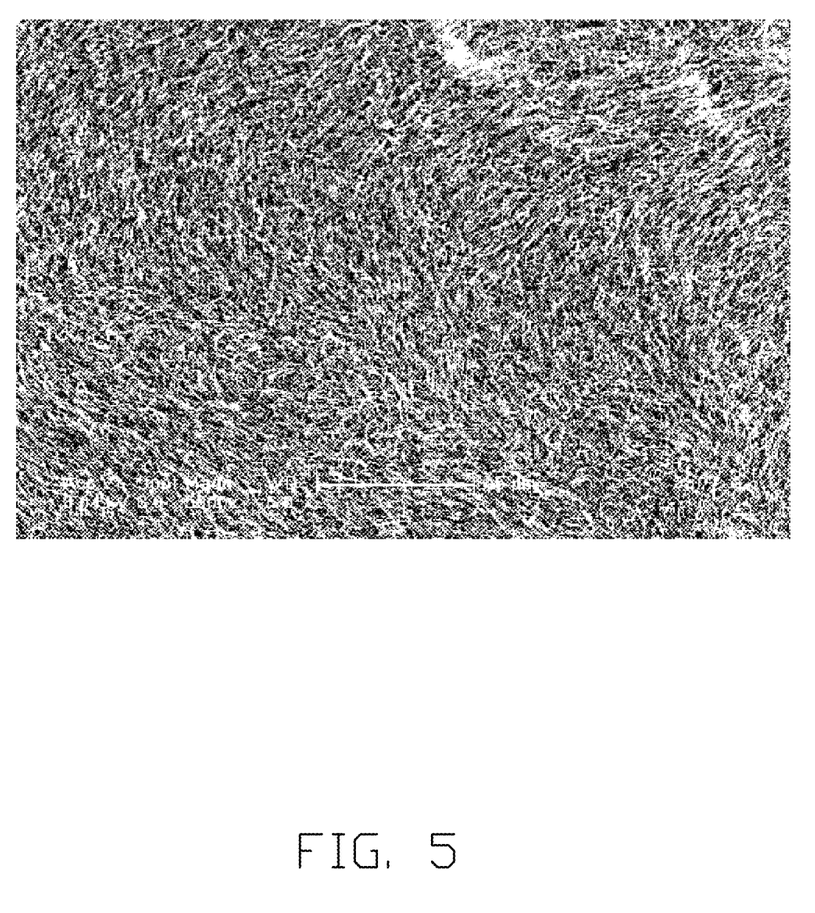
FIG. 5 is an SEM image of a pressed carbon nanotube film including a plurality of carbon nanotubes which is arranged along different direction.

Referring to FIGS. 4 and 5, the at least one pressed carbon nanotube film includes a plurality of carbon nanotubes. The carbon nanotubes in the at least one pressed carbon nanotube film can be arranged along a same direction, as shown in FIG. 4. The carbon nanotubes in the at least one pressed carbon nanotube film can be arranged along different directions, as shown in FIG. 5. The carbon nanotubes in the at least one pressed carbon nanotube film can rest upon each other. An angle between a primary alignment direction of the carbon nanotubes and a surface of the at least one pressed carbon nanotube film is about 0 degrees to approximately 15 degrees. The greater the pressure applied, the smaller the angle obtained. If the carbon nanotubes in the at least one pressed carbon nanotube film are arranged along different directions, the at least one pressed carbon nanotube film can have properties that are identical in all directions substantially parallel to the surface of the at least one pressed carbon nanotube film. Adjacent carbon nanotubes are attracted to each other and are joined by van der Waals attractive force. Therefore, the at least one pressed carbon nanotube film is easy to bend to desired shapes without breaking. Further, the at least one pressed carbon nanotube film is a free-standing film.

The term "free-standing" includes, but not limited to, the carbon nanotube layer 106 that does not have to be supported by a substrate. For example, the free-standing carbon nanotube layer 106 can sustain the weight of itself when it is hoisted by a portion thereof without any significant damage to its structural integrity. So, if the free-standing carbon nanotube layer 106 is placed between two separate supporters, a portion of the free-standing carbon nanotube layer 106, not in contact with the two supporters, would be suspended between the two supporters and yet maintain film structural integrity.

The reactor 10 includes an upper sidewall 101, a lower sidewall 103 opposite to the upper sidewall 101, a left sidewall 105, and a right sidewall 107 opposite to the left sidewall 105. The upper sidewall 101, the lower sidewall 103, the left sidewall 105, and the right sidewall 107 form a room. A first inlet opening 104 is defined in the left sidewall 105, and a second inlet opening 108 is defined in the right sidewall 107. The lower sidewall 103 can define a hole 102 for discharging exhaust gas or liquid. The hole 102 can be omitted. A material of the reactor 10 should not be dissolved in or react with the polymer monomer solution gas and the oxidant solution gas, such as resin or ceramic. The resin can be polytetrafluoroethylene (PTFE). In one embodiment, the reactor 10 is a reaction kettle made of PTFE.

A first pipe 20 is engaged in the first inlet opening 104. A second pipe 22 is engaged in the second inlet opening 108. A first vessel 30 is located on upside of the first pipe 20 and connected to the first pipe 20. A second vessel 32 is located on upside of the second pipe 22 and connected to the second pipe 22. The first pipe 20 has a first end 202 and a second end 204 opposite to the first end 202. The first pipe 20 is connected to the reactor 10 by connecting the first end 202 of the first pipe 20 to the first inlet opening 104 of the left sidewall 105 of the reactor 10. The second pipe 22 has a third end 222 and a fourth end 224 opposite to the third end 222. The second pipe 22 is connected to the reactor 10 by connecting the third end 222 of the second pipe 22 to the second inlet opening 108 of the right sidewall 107 of the reactor 10.

A pressure providing device 40 is connected to the second end 204 of the first pipe 20 and the fourth end 224 of the second pipe 22. The pressure providing device 40 can be selected according to need, such as compressed air source or ultrasonic generator.

A material of the first vessel 30, the second vessel 32, the first pipe 20, and the second pipe 22 should not be dissolved in or react with the polymer monomer and the oxidant, such as resin or ceramic. In one embodiment, the material of the first vessel 30 and the second vessel 32 is polytetrafluoroethylene (PTFE), the first pipe 20 and the second pipe 22 are airbrushes.

Method for suspending the carbon nanotube layer 106 in the reactor 10 can be selected according to need. The carbon nanotube layer 106 can be placed between two separate supporters, or located on a ring shaped substrate. In detail, the two separate supporters can be located on the lower sidewall 103 of the reactor 10, the carbon nanotube layer 106 is placed between two separate supporters, and a portion of the free-standing carbon nanotube layer 106 is not in contact with the two supporters. The ring shaped substrate can be placed on the lower sidewall 103, or fixed on the upper sidewall 101, the left sidewall 105, or the right sidewall 107 of the reactor 10. In one embodiment, the carbon nanotube layer 106 located on a ring shaped metal frame is perpendicular to the lower sidewall 103 and parallel to the left sidewall 105. The carbon nanotube layer 106 is not destroyed.

In the step (S12), the polymer monomer solution can be formed by dissolving a polymer monomer in a solvent. The oxidant solution can be formed by dissolving an oxidant in a solvent. The oxidant can initiate a polymerization of the polymer monomer. The polymer monomer can be aniline, thiophene, pyrrole, acrylonitrile, ethanol, propylene, styrene, or chloroethylene. The oxidant can be selected according to the polymer monomer, such as nitric acid, sulphuric acid, or ammonium persulphate. The solvent can be selected according to the polymer monomer or the oxidant, such as ethanol or Methanol. In one embodiment, the polymer monomer solution is aniline solution formed by dissolving aniline in hydrochloric acid or ethanol, the oxidant solution is ammonium persulphate solution formed by dissolving ammonium persulphate in water.

A concentration of the polymer monomer solution and the oxidant solution can be selected according to need. The concentration of the polymer monomer solution can be in a range from about 0.01 moles per liter to about 2 moles per liter. The concentration of the oxidant solution can be in a range from about 0.01 moles per liter to about 2 moles per liter. In one embodiment, the concentration of the aniline solution is 0.05 moles per liter, and the concentration of the ammonium persulphate solution is 0.05 moles per liter.

Referring to FIG. 1, the polymer monomer solution is in the first vessel 30. The polymer monomer solution can flow into the first pipe 20 from the first vessel 30. The oxidant solution is in the second vessel 32. The oxidant solution can flow into the second pipe 22 from the second vessel 32.

In the step (S13), the pressure can be provided by the pressure providing device 40.

When the pressure providing device 40 is the compressed air source, compressed air can resume original volume after taking out of the compressed air source and generate the pressure. The compressed air source is located on the second end 204 of the first pipe 20, and the pressure can make the polymer monomer solution in the first pipe 20 be in gas state. The polymer monomer solution gas can be formed. The polymer monomer solution gas can enter into the reactor 10 from the first pipe 20 through the first inlet opening 104 of the left sidewall 105 by the pressure. The polymer monomer solution gas includes a plurality of even and tiny bubbles of polymer monomer solution.

When the compressed air source is located on the forth end 224 of the second pipe 22, the pressure can make the oxidant solution in the second pipe 22 be in gas state. The oxidant solution gas can be formed. The oxidant solution gas can enter into the reactor 10 from the second pipe 22 through the second inlet opening 108 of the right sidewall 107 by the pressure. The oxidant solution gas includes a plurality of even and tiny bubbles of oxidant solution.

The reactor 10 is filled with the polymer monomer solution gas and the oxidant solution gas by adjusting the pressure. The pressure can be in a range from about 1 pound per square inch (PSI) to about 20 PSI. In one embodiment, the pressure is about 5 PSI.

When the pressure providing device 40 is the ultrasonic generator, the pressure can be formed by acoustic oscillation of the ultrasonic. The ultrasonic generator is located on the second end 204 of the first pipe 20, and the pressure can make the polymer monomer solution in the first pipe 20 be in gas state. The polymer monomer solution gas can be formed. The polymer monomer solution gas can enter into the reactor 10 from the first pipe 20 through the first inlet opening 104 of the left sidewall 105 by the pressure.

When the ultrasonic generator is located on the forth end 224 of the second pipe 22, the pressure can make the oxidant solution in the second pipe 22 be in gas state. The oxidant solution gas can be formed. The oxidant solution gas can enter into the reactor 10 from the second pipe 22 through the second inlet opening 108 of the right sidewall 107 by the pressure. A power of the ultrasonic generator can be in a range from about 10 watts to about 100 watts. A time of the acoustic oscillation can be in a range from about 1 min to about 15 min.

The carbon nanotube layer 106 is suspended in the reactor 10, and the polymer monomer solution gas and the oxidant solution gas immerse each of the plurality of carbon nanotubes. The polymer monomer solution gas is polymerized to a polymer and chemically bonded to each of the plurality of carbon nanotubes in initiation of the oxidant solution gas. Therefore, the carbon nanotube composite structure is produced. The carbon nanotube composite structure is a polymer/carbon nanotube composite. A chemical bond formed between the polymer and each of the plurality of carbon nanotubes is covalent bond. The polymer can circularly or spirally winds each of the plurality of carbon nanotubes by the covalent bond. The polymer can enclose each of the plurality of carbon nanotubes by the covalent bond. The polymer can be disorderly connect to each of the plurality of carbon nanotubes by the covalent bond. In one embodiment, the carbon nanotube composite structure is bonding the polyaniline to two stacked drawn carbon nanotube films, and the polyaniline enclose each of the plurality of carbon nanotubes by the covalent bond, as shown in FIGS. 6-9.

In the reactor 10, a flow speed of the polymer monomer solution gas is equal to a flow speed of the oxidant solution gas. The flow speed of the polymer monomer solution gas ranges from about 25 sccm to about 50 sccm, the flow speed of the oxidant solution gas ranges from about 25 sccm to about 50 sccm. A time for making the polymer monomer solution gas enter into the reactor 10 is equal to a time for making the oxidant solution gas enter into the reactor 10. The time is equal to a time for applying the pressure that is in a range from about 0.5 minutes to about 15 minutes. The time for making the polymer monomer solution gas and the oxidant solution gas enter into the reactor 10 is in a range from about 0.5 min to about 15 min. In one embodiment, the flow speed of the aniline solution gas and the ammonium persulphate solution gas is in a range from about 30 sccm to about 40 sccm, the time of making the aniline solution gas and the ammonium persulphate solution gas enter into the reactor 10 is in a range from about 1 min to about 4 min.

Figure 6:
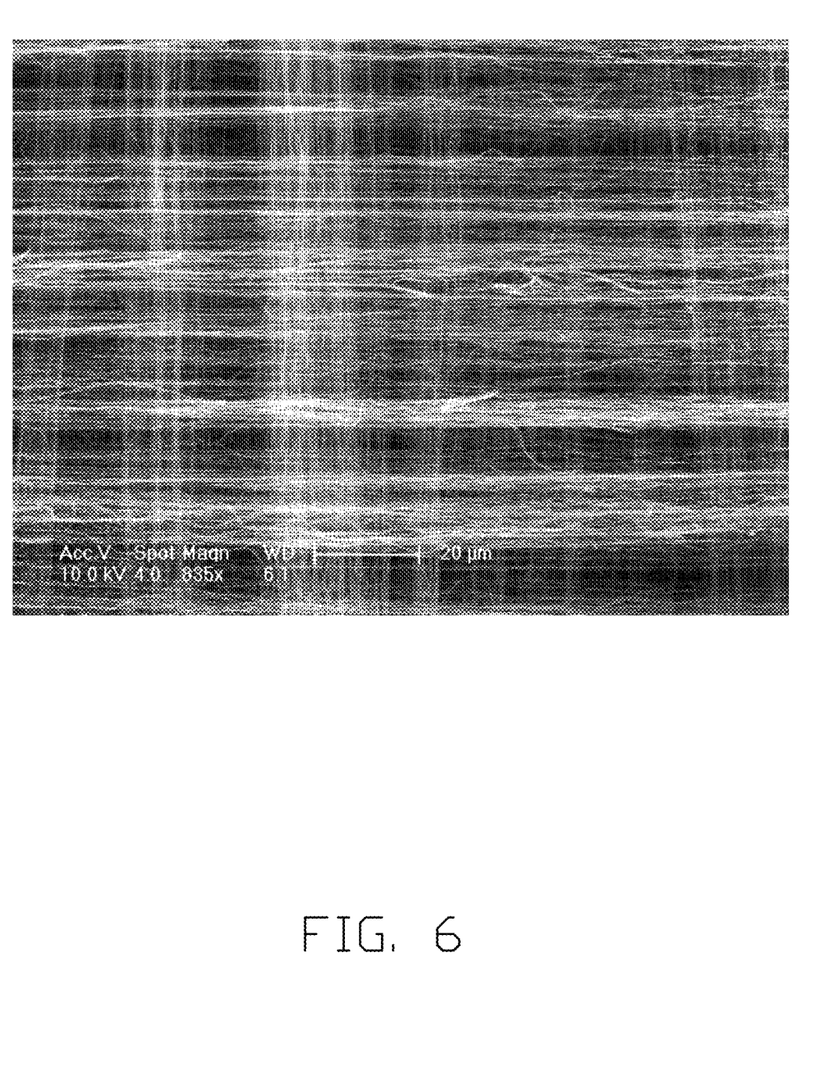
FIG. 6 is an SEM image of one embodiment of carbon nanotube composite structure.

In one embodiment, when the concentration of the aniline solution and the ammonium persulphate solution is about 0.05 moles per liter, the flow speed of the aniline solution gas and the ammonium persulphate solution gas is about 30 sccm, the time for making the aniline solution gas and the ammonium persulphate solution gas enter into the reactor 10 is 1 min, the carbon nanotube composite structure is formed, as shown in FIG. 6.

Figure 7:
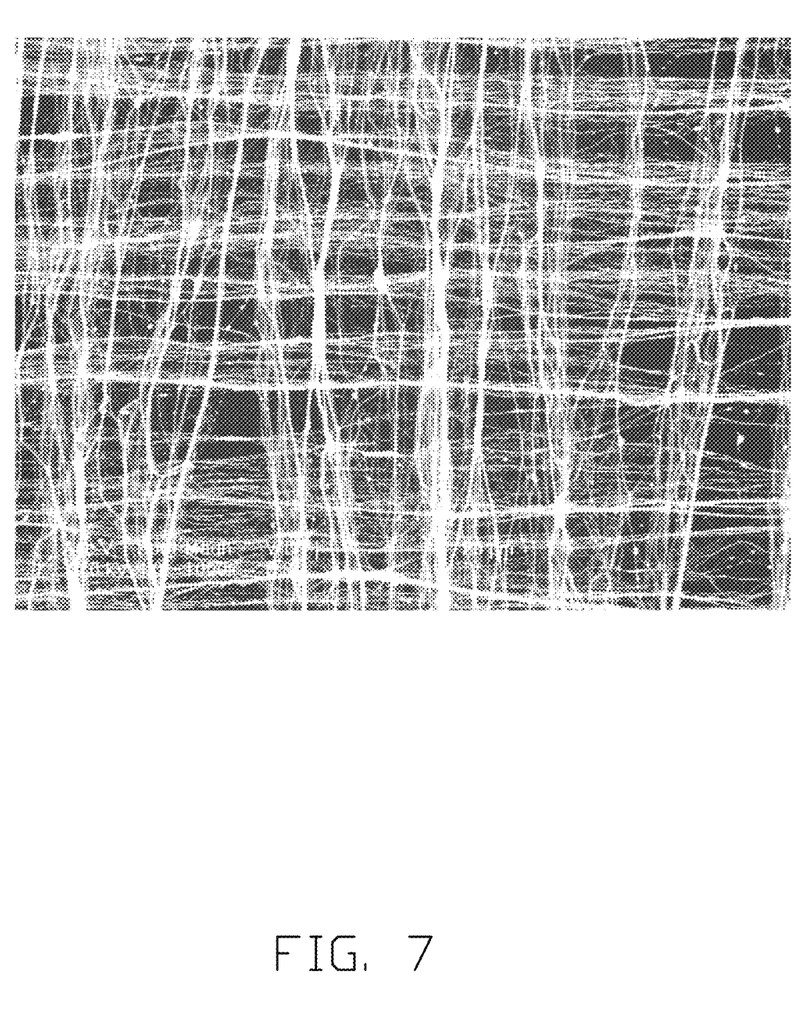
FIG. 7 is an SEM image of another embodiment of carbon nanotube composite structure.

When the concentration of the aniline solution and the ammonium persulphate solution is about 0.05 moles per liter, the flow speed of the aniline solution gas and the ammonium persulphate solution gas is about 30 sccm, the time for making the aniline solution gas and the ammonium persulphate solution gas enter into the reactor 10 is 2 min, the carbon nanotube composite structure is formed, as shown in FIG. 7.

Figure 8:
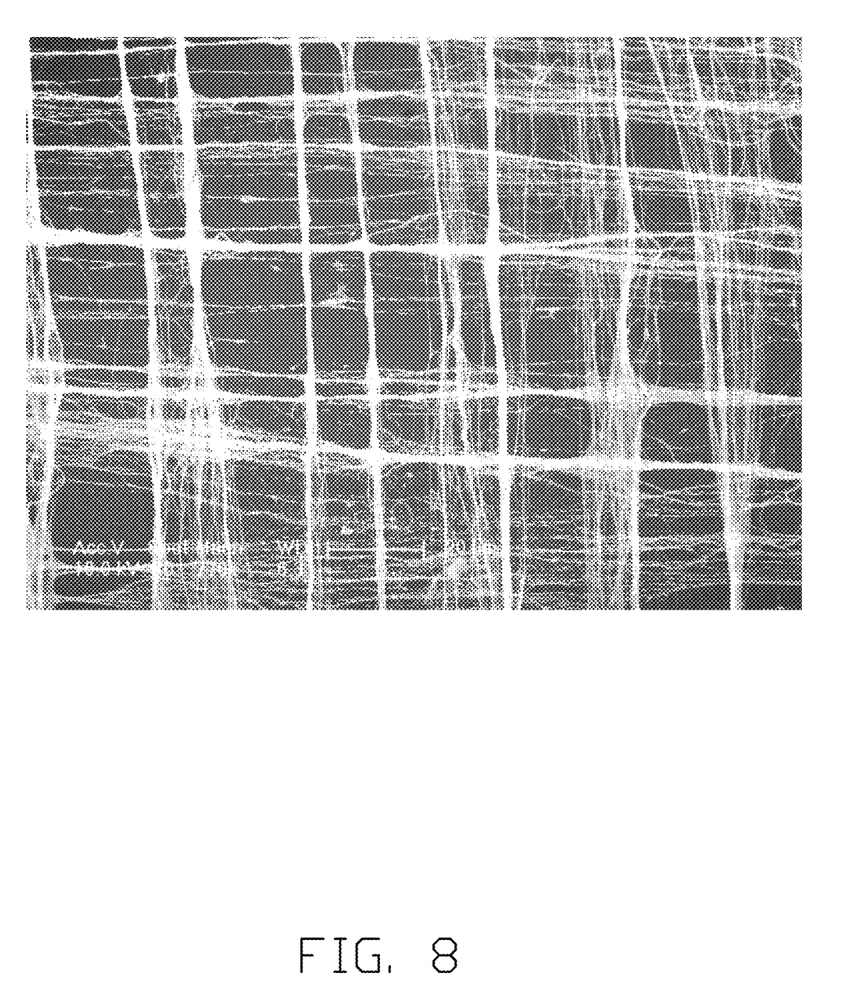
FIG. 8 is an SEM image of yet another embodiment of carbon nanotube composite structure.

When the concentration of the aniline solution and the ammonium persulphate solution is about 0.05 moles per liter, the flow speed of the aniline solution gas and the ammonium persulphate solution gas is about 30 sccm, the time for making the aniline solution gas and the ammonium persulphate solution gas enter into the reactor 10 is 3 min, the carbon nanotube composite structure is formed, as shown in FIG. 8.

Figure 9:
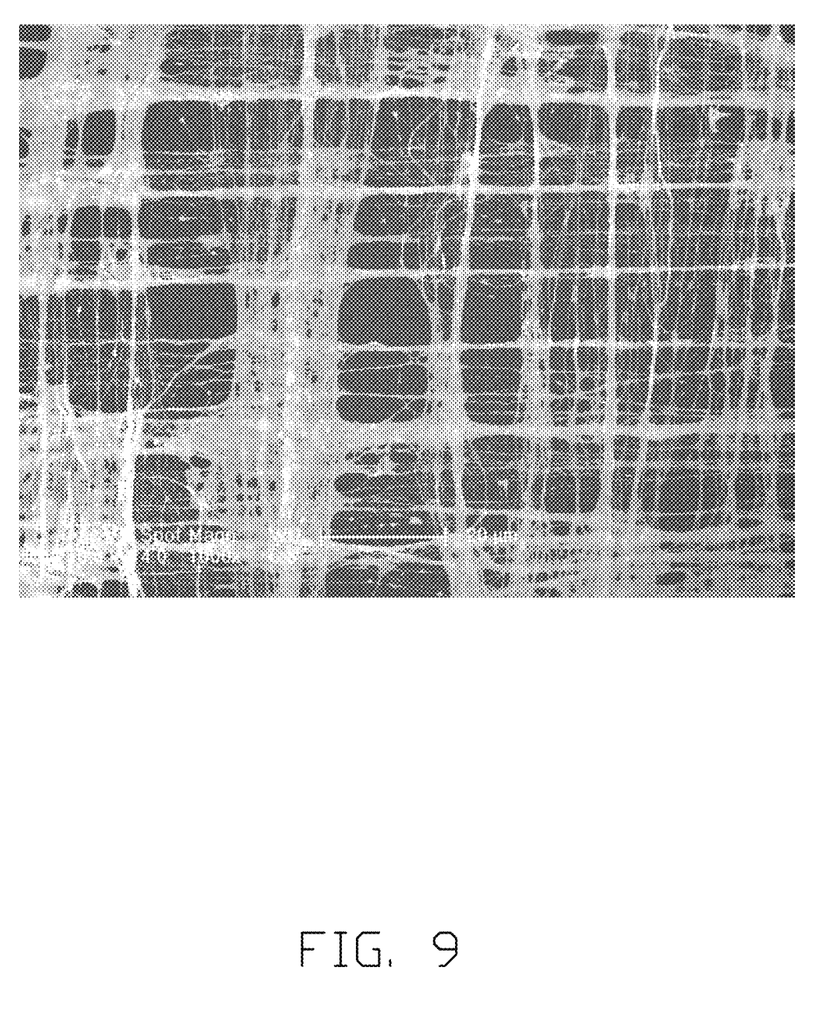
FIG. 9 is an SEM image of yet another embodiment of carbon nanotube composite structure.

When the concentration of the aniline solution and the ammonium persulphate solution is about 0.05 moles per liter, the flow speed of the aniline solution gas and the ammonium persulphate solution gas is about 30 sccm, the time for making the aniline solution gas and the ammonium persulphate solution gas enter into the reactor 10 is 4 min, the carbon nanotube composite structure is formed, as shown in FIG. 9.

Figure 10:
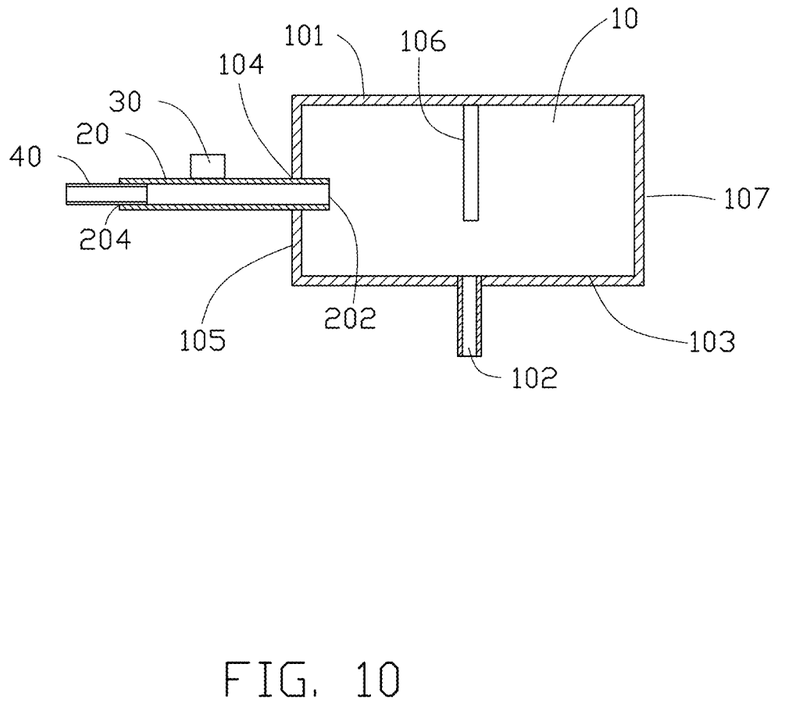
FIG. 10 is a schematic view of an apparatus according to another embodiment for making a carbon nanotube composite structure.

Referring to FIG. 10, a method for making carbon nanotube composite structure of another embodiment includes steps of:

(S21), suspending a carbon nanotube layer 106 in a reactor 10;

(S22), providing a polymer solution; and (S23), gasifying the polymer solution to form polymer solution gas by a pressure, wherein the polymer solution gas is chemically bonded to the carbon nanotube layer 106.

In the step (S21), this embodiment of the method for making carbon nanotube composite structure is shown where the right sidewall 107 of the reactor 10 is continuous but no define the second inlet opening 108.

In the step (S22), the polymer solution is formed by dissolving a polymer material in a solvent. The polymer material can be polyaniline, ethoxyline, bismaleimide, cyanate ester, polypropylene, polystyrene, polyvinyl alcohol, polystyrene enolate, polycarbonate, or polymethyl methacrylate. The solvent can be selected according to the polymer material, such as ethanol or Methanol. In one embodiment, the polymer material is polyaniline, the solvent is ethanol.

Referring to FIG. 10, the polymer solution is in a first vessel 30. The first vessel 30 is located on upside of a first pipe 20 and connected to the first pipe 20. The polymer solution can flow into the first pipe 20 from the first vessel 30. The first pipe 20 has a first end 202 and a second end 204 opposite to the first end 202. The first pipe 20 is connected to the reactor 10 by connecting the first end 202 of the first pipe 20 to the first inlet opening 104 of the left sidewall 105 of the reactor 10.

A material of the first vessel 30 and the first pipe 20 should not be dissolved in or react with the polymer material, such as resin or ceramic. In one embodiment, the material of the first vessel 30 is polytetrafluoroethylene (PTFE), the first pipe 20 is airbrushes.

In the step (S23), this embodiment of the method for making carbon nanotube composite structure is shown where the polymer solution gas is chemically bonded to each of the plurality of carbon nanotubes of the carbon nanotube layer 106 by covalent bond, to form the carbon nanotube composite structure.

In summary, in order to making polymer/carbon nanotube composite, the carbon nanotube layer 106 can be suspended in the polymer monomer solution gas and the oxidant solution gas, or in the polymer solution gas. A structure of the carbon nanotube layer is not destroyed.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube composite structure comprising:
    providing a polymer monomer solution and an oxidant solution formed by dissolving an oxidant in a solvent;
    gasifying the polymer monomer solution and the oxidant solution to form a polymer monomer solution gas and an oxidant solution gas by a pressure; and
    suspending a carbon nanotube layer comprising a plurality of carbon nanotubes combined by van der Waals attractive force in the polymer monomer solution gas and the oxidant solution gas.

2. The method of claim 1, comprising suspending the carbon nanotube layer in a reactor by two separate supporters or a ring shaped substrate.

3. The method of claim 2, wherein the carbon nanotube layer is perpendicular to a lower sidewall and parallel to two sidewalls of the reactor.

4. The method of claim 1, wherein the carbon nanotube layer comprises at least one drawn carbon nanotube film, at least one flocculated carbon nanotube film, or at least one pressed carbon nanotube film.

5. The method of claim 1, wherein the carbon nanotube layer comprises two drawn carbon nanotube films comprising the plurality of carbon nanotubes, and an angle between aligned directions of the plurality of carbon nanotubes in the two drawn carbon nanotube films is in a range from about 0 degrees to about 90 degrees.

6. The method of claim 1, comprising providing the polymer monomer solution in a first vessel located on upside of a first pipe and connected to the first pipe, and making the polymer monomer solution flow into the first pipe from the first vessel.

7. The method of claim 6, comprising applying the pressure so that the polymer monomer solution in the first pipe become the polymer monomer solution gas, and directing the polymer monomer solution gas into a reactor connected to the first pipe.

8. The method of claim 1, wherein the oxidant solution is in a second vessel located on upside of a second pipe and connected to the second pipe, and the oxidant solution flow into the second pipe from the second vessel.

9. The method of claim 8, comprising applying the pressure so that the oxidant solution in the second pipe become the oxidant solution gas, and directing the oxidant solution gas into a reactor connected to the second pipe.

10. The method of claim 1, wherein the pressure is provided by a compressed air source or ultrasonic generator.

11. The method of claim 1, wherein the pressure is applied so that a flow speed of the polymer monomer solution gas and the oxidant solution gas is in a range from about 25 sccm to about 50 sccm, and the pressure is applied for from about 0.5 minutes to about 15 minutes.

12. The method of claim 1, wherein the polymer monomer solution is aniline solution, and the oxidant solution is ammonium persulphate solution.

13. The method of claim 12, wherein the pressure is applied so that a flow speed of aniline solution gas and ammonium persulphate solution gas is in a range from about 30 sccm to about 40 sccm, and the pressure is applied for from about 1 minute to about 4 minutes.

14. The method of claim 1, wherein the polymer monomer solution gas is polymerized and chemically bonded to each of the plurality of carbon nanotubes by covalent bond.

15. A method for making a carbon nanotube composite structure comprising:
    gasifying a polymer solution to form a polymer solution gas by a pressure; and suspending a carbon nanotube layer comprising a plurality of carbon nanotubes joined end-to-end by van der Waals attractive force and arranged approximately along a same direction in the polymer solution gas.

16. The method of claim 15, wherein the polymer solution is in a first vessel located on upside of a first pipe and connected to the first pipe, and the polymer solution flow into the first pipe from the first vessel.

17. The method of claim 16, comprising applying the pressure so that the polymer solution in the first pipe become the polymer solution gas, and directing the polymer solution gas into a reactor connected to the first pipe.

18. The method of claim 15, wherein the pressure is provided by a compressed air source or ultrasonic generator.

19. A method for making a carbon nanotube composite structure comprising:
   suspending a carbon nanotube layer comprising a plurality of carbon nanotubes parallel to a surface of the carbon nanotube layer in a reactor; and
   gasifying a polymer monomer solution and an oxidant solution to form a polymer monomer solution gas and an oxidant solution gas by a pressure, and filling the reactor with the polymer monomer solution gas and the oxidant solution gas, wherein the oxidant solution is formed by dissolving an oxidant in a solvent.

* * * * *